(12) United States Patent
Harada et al.

(10) Patent No.: US 8,075,811 B2
(45) Date of Patent: Dec. 13, 2011

(54) METHOD FOR MANUFACTURING PARTICULATE CHEMICAL SUBSTANCES AND PARTICULATE PRODUCTS OF SUCH SUBSTANCES

(75) Inventors: Hiroshi Harada, Kawaguchi (JP); Shinichi Miyamoto, Kawaguchi (JP)

(73) Assignee: Seiko Chemical Co., Ltd., Tokyo (JP)

( * ) Notice: Subject to any disclaimer, the term of this patent is extended or adjusted under 35 U.S.C. 154(b) by 975 days.

(21) Appl. No.: 11/922,566

(22) PCT Filed: Mar. 31, 2006

(86) PCT No.: PCT/JP2006/307391
§ 371 (c)(1),
(2), (4) Date: Feb. 12, 2008

(87) PCT Pub. No.: WO2006/137206
PCT Pub. Date: Dec. 28, 2006

(65) Prior Publication Data
US 2008/0268245 A1     Oct. 30, 2008

(51) Int. Cl.
*B29B 9/00* (2006.01)
(52) U.S. Cl. ............................................. 264/12; 264/13
(58) Field of Classification Search .................. None
See application file for complete search history.

(56) References Cited

U.S. PATENT DOCUMENTS

| | | | |
|---|---|---|---|
| 2,979,764 A | 4/1961 | Andrew | 18/2.7 |
| 4,871,489 A | 10/1989 | Ketcham | 264/9 |
| 5,628,937 A | 5/1997 | Oliver et al. | 264/9 |
| 6,284,279 B1 | 9/2001 | Vanzin | 424/489 |
| 6,378,788 B1 | 4/2002 | Skeath et al. | 239/424.5 |
| 6,485,750 B2 | 11/2002 | Vanzin | 424/489 |
| 6,983,612 B2 | 1/2006 | Beyer et al. | 62/74 |
| 2002/0007869 A1 | 1/2002 | Pui et al. | 141/173 |
| 2002/0182279 A1* | 12/2002 | Day | 425/6 |
| 2005/0224998 A1* | 10/2005 | Andrady et al. | 264/10 |
| 2006/0166841 A1 | 7/2006 | Beyer et al. | 508/251 |

FOREIGN PATENT DOCUMENTS

| | | |
|---|---|---|
| EP | 1 362 634 | 11/2003 |
| GB | 977128 | 12/1964 |
| GB | 1149941 | 4/1969 |
| WO | WO99/33555 | 7/1999 |
| WO | WO01/40209 | 6/2001 |

* cited by examiner

Primary Examiner — Mary F Theisen
(74) Attorney, Agent, or Firm — Steptoe & Johnson LLP

(57) ABSTRACT

Particulate chemical substances and method of manufacturing thereof wherein the resultant particles have a narrow particle size distribution and sufficient hardness to ensure that particles can withstand intact being driven through pneumatic transportation equipment. The method comprises granulating raw material using a spray granulation apparatus having a nozzle plate equipped with nozzle pipes having a length in the range of 2-100 mm.

7 Claims, 5 Drawing Sheets

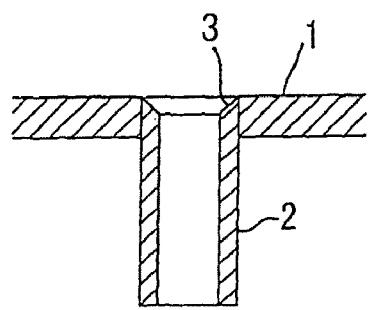 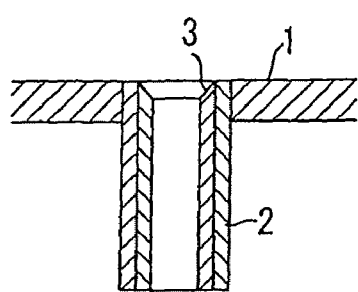 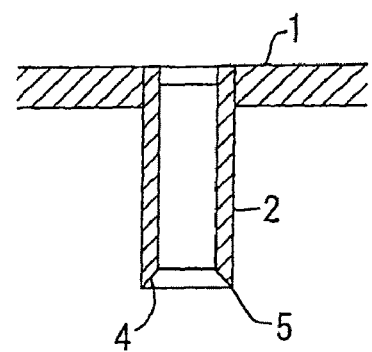
FIG.2(a)  FIG.2(b)  FIG.2(c)
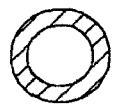 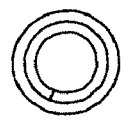 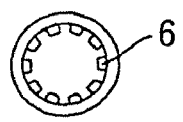
FIG.2(d)  FIG.2(e)  FIG.2(f)

METHOD FOR MANUFACTURING PARTICULATE CHEMICAL SUBSTANCES AND PARTICULATE PRODUCTS OF SUCH SUBSTANCES

The present application is based on International Application PCT/JP2006/307391, filed Mar. 31, 2006, which claims priority to Japanese Patent Application No. 2005-183371, filed Jun. 23, 2005, the entire contents of which are hereby incorporated by reference.

TECHNICAL FIELD

The present invention relates to a method for manufacturing particulate chemical substances using a spray granulation apparatus and to a chemical substance in particulate form having a specific particle size distribution, a desired hardness, and a substantially round cross-sectional configuration, manufactured by the inventive method.

BACKGROUND ART

A method for granulating a chemical substance having a melting point of 50-250° C. using a spray granulation apparatus is disclosed in Particulate Process and Technology, (supplemented revision), Chapter on Granulation, 3.3 Injection Granulation Apparatus, pages 43-50, Chemical Industry Publishing Co., Jan. 10, 1988. There is disclosed in a PCT International Patent Application Publication WO99/33555 a method for manufacturing a particulate chemical substance having a quite limited particle size distribution, which comprises the step of dropping a molten chemical from a nozzle plate, and blowing a cooling medium to dropping granules co-currently. The apparatus used in this method is commercially available from Goudsche Machinefabriek B. V. GMF Gouda, a company in the Netherlands, under the trademark Jet Priller. A published Japanese translation of PCT Application No. 2003-515598 describes that that apparatus can be used in granulation of phenothiazine, and in fact, the granulation using the same apparatus is carried out in Example 2.

As disclosed in Paragraph 0023 of published Japanese translation of PCT Application No. 2003-515598, the method employed in that document requires the steps of heating an inert gas such as nitrogen gas, and melting phenothiazine by using the heated gas at the time of melting it. Generally, a method for heating a gas possesses a problem in the viewpoint of energy consumption, compared with the case of heating a liquid. Furthermore, the method disclosed in that patent document, Paragraph 0025 thereof states that a vibration is given to molten chemical substance during its falling-down. There is described in a concrete manner no reason why the vibration is given at that stage in this document. However, it can be considered, based on the description of that paragraph, to form the molten substance, which is falling down from the nozzle into smaller droplets by giving a vibration at that stage. A similar description can be found in Claim 1 and Paragraph 0016 of a published Japanese translation of PCT Application No. 2004-502683. However, to make the molten substance into smaller droplets by giving vibration has a risk in that particulate chemical substances having a desired particle size distribution can not be obtained unless a vibration frequency is properly chosen.

In a process using as a raw material a large amount of a chemical substance which is solid at normal temperature, pneumatically transported substance is fed by air directly to process equipment via a pipe line at a prescribed feed rate using a prescribed volume of air. The properties required for the chemical substance to be pneumatically transported include an appropriate particle size distribution for ensuring delivery of a prescribed amount at a prescribed speed without leaving significant residues in the pipe, and sufficient strength preventing the particles from shredding into powder by colliding against the wall of pipes and the like. However, the methods disclosed in the above-mentioned patent documents are not said to produce particulate chemical substance having narrow particle size distribution and high hardness sufficient for use in pneumatic transportation processes.

DISCLOSURE OF INVENTION

The objects of the present invention are to provide a method for producing a particulate chemical substance obtainable by making a molten chemical substance having melting point of 50 to 250° C. drop from a nozzle by giving a certain pressure thereto; the shape of said particulate chemical substance being substantially spherical; wherein the share of the particulate substance having particle diameter from 1.0 mm to of less than 2.0 mm is 80% or more, and that having particle diameter of from 0.5 mm to less than 1.0 mm is less than 20%; preferably, the particulate substance having particle diameter of from to 1.0 mm to less than 2.0 mm is 85% or more, and that having particle diameter of from 0.5 mm to less than 1.0 mm is less than 15%; and thereby to provide a particulate chemical substance.

The inventors of the present invention have found, as a result of intensive studies, that a particulate chemical substance can be manufactured by granulating a substance having a melting point of 50-250° C. using a spray granulation apparatus wherein a nozzle plate is equipped with nozzle pipes with a length in the range of 2-100 mm. The nozzle plate preferably comprises a nozzle plate base comprising a rigid, substantially planar plate having a plurality of nozzle holes therein, each hole receiving a nozzle pipe, and a plurality of nozzle pipes being received by the nozzle holes so that the nozzle pipes extend downwardly from the nozzle holes in such a manner that the axes of the pipes are substantially parallel to each other. This nozzle plate is preferably equipped with a plurality of nozzle pipes spaced at intervals of 5-50 mm. The nozzle pipes are also preferably made of a material having high wear- and acid-resistance.

Moreover, according to the present invention, there is provided a particulate substance having a melting point of 50 to 250° C. and comprising 80% or more of the particulate having particle diameter of from 1.0 mm to less than 2.0 mm, and less than 20% of the particulate having particle diameter of from 0.5 mm to less than 1.0 mm, preferably, a particulate substance comprising 85% or more of the particulate having particle diameter of from 1.0 mm to less than 2.0 mm, and less than 15% of the particulate having particle diameter of from 0.5 mm to less than 1.0 mm. Said particulate substance whose shape is substantially spherical is obtain able in situ by making a molten chemical substance drop from the nozzle plate having a length sufficient to form particulate substance having a predetermined particle diameter and under a certain pressure.

The method of manufacturing the particulate chemical substance, and the resulting particulate chemical substance of the present invention are substantial improvements over conventional methods and products produced therefrom from the viewpoint of preventing dust generation due to crushing during transportation and handling in manufacturing plants.

BRIEF DESCRIPTION OF THE DRAWINGS

FIG. 2(a) shows a schematic view of a vertical cross section of a single nozzle pipe which is one embodiment of the nozzle pipes used in the present invention; the vertical cross section of the structure of nozzle pipe having a tapered portion having a tapered cross section at the upper portion of the bonding between the nozzle plate and the nozzle pipe in the nozzle hole.

FIG. 2(b) shows a schematic view of a vertical cross section of a double nozzle pipe which is another embodiment of the nozzle pipes used in the present invention; the vertical cross section of the structure of the double nozzle pipe having a tapered portion at the upper portion of the bonding between the nozzle plate and the nozzle pipe.

FIG. 2(c) shows a schematic view of a vertical cross section of a single nozzle pipe which is a further embodiment of the nozzle pipes used in the present invention; the vertical cross section of the structure of the nozzle pipe having a portion which expands gradually downwardly towards the tip of the nozzle pipe.

FIG. 2(d) is a schematic view showing a cross section in the horizontal direction of a thick single nozzle pipe.

FIG. 2(e) is a schematic view showing a cross section in the horizontal direction of a double nozzle pipe.

FIG. 2(f) is a schematic view showing a cross section of nozzle pipe having a plural number of elevated portions at predetermined spacing in its internal face.

Figure 1:
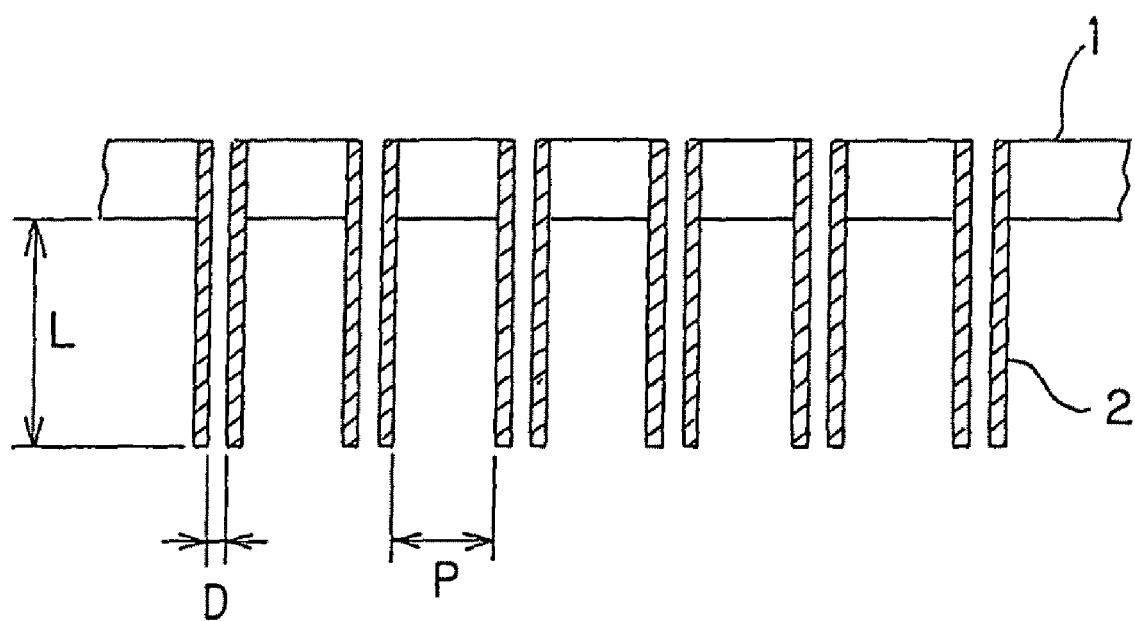
FIG. 1 is a partial cross-sectional diagram illustrating the construction of a nozzle plate usable in the present invention.

| Reference Numerals | |
|---|---|
| 1: | nozzle plate |
| 2: | nozzle pipe |
| 3: | tapered portion |
| 4: | downwardly extended portion |
| 5: | tip |
| L: | length of nozzle pipe |
| D: | internal diameter of nozzle pipe |
| P: | distance between nozzle pipes |

BEST MODE FOR CARRYING OUT THE INVENTION

Any substance having a melting point in the range of 50-250° C. may be used for granulation in the present invention, without any specific limitation, provided that the substance is not denatured when heated to a temperature about 10° C. higher than, preferably 20° C. higher than, and more preferably 30° C. higher than, the melting point thereof. Examples of typical chemical substances having such properties are organic substances such as various fatty acids and derivatives thereof, paraffin wax, naphthalene, phthalic anhydride, benzoic acid, and phenothiazine, as well as various inorganic substances. Some substances may not produce products with a desired hardness. It is preferable previously to confirm such properties of a substance by small scale manufacturing and the like.

The expression "the shape is substantially spherical" means that at least 97%, and preferably 99%, of the particles are spherical, with only three percent or less, preferably at most one percent, show shapes other than spherical shape, such as one having a dent portion, one having a confetti-like shape, one having dumbbell-like shape which apparently was formed by bonding of two or more particles during dropping or the like. When examined, under a microscope with ten times magnification, for example, ten by ten or subsequently one hundred particles sampled at random from samples spread in a single layer over a surface of a desired container, such as a laboratory dish having a diameter of 10 cm, after taking samples from products just produced.

Any spray granulation apparatus, wherein the nozzle plate is replaceable, may be used in the manufacturing method of the present invention. An apparatus comprising major units, such as a granulation tower satisfying desired specifications in accordance with the properties of a chemical substance used as a raw material, is preferably used. A nozzle plate should have a nozzle pipe having at least a predetermined length and extended in the dropping direction of droplets from the nozzle hole. For example, a nozzle plate equipped with nozzle pipes having a configuration schematically shown in FIG. 1 can be suitably used. However, in the nozzle plate previously used in this type of apparatus, nozzle holes were provided at the same level as the surface of the nozzle plate, or only slightly protruded from the surface of the nozzle plate, due to the physical factors at the time of forming the nozzle holes. If this prior type of nozzle plate is used, the granulated chemical substance may adhere to the surface of the nozzle plate near the nozzle holes, thereby narrowing or clogging the nozzle holes, unless a vibration is given to the dropping liquid by a suitable means, such as for example, a vibration means, depending on the properties of the substance. As a result, a chemical substance with a desired particle distribution may not be obtained. Particularly, in the case of a nozzle plate made from stainless steel, which is widely used due to its excellent acid resistance, the nozzle holes have a sawtooth-like horizontal cross-section because nozzle holes are produced by laser processing. Particles produced by such nozzle holes typically do not have a round or circular cross-section. This tendency is particularly evident in nozzle holes having a diameter of 1.0 mm or less. The cross-section of the resulting particles is not round or circular. Some particles are partly constricted and many other particles are too large, giving rise to an unduly low production efficiency.

In the present specification, the length L of the nozzle pipe means the length of the vertical extent of the pipe from the nozzle plate surface, from which the nozzle pipe projects, to the tip of the nozzle pipe. The length L of the nozzle pipe in the present invention is preferably in the range of 2-100 mm, and more preferably in the range of 5-50 mm. If the nozzle pipe length is less than 2 mm, particles dropping from the nozzle holes are adversely affected by inert gas, such as nitrogen gas or argon gas, or air, blown from a cooling fan. Some particles come into contact with each other and combine to form particles having a non-spherical shape, such as giant particles or the like. Some particles are blown away and disintegrate into powder before solidification. If the length L of the nozzle is more than 100 mm, depending on the properties of the chemical substance used, a liquefied substance may solidify before dropping from the nozzle holes and clog the nozzle holes.

The number of nozzle pipes provided in the nozzle plate should be determined according to the size of the apparatus, properties of the chemical substances to be used therein, production efficiency, and the like. The distance P between adjacent nozzle pipes is usually in the range of 5-50 mm, and preferably in the range of 10-30 mm. A person skilled in the art will appreciate that a desired inter-nozzle pipe distance may be selected according to the configuration of the nozzle plate and the like, and that every one of a plurality of nozzle pipes in a single nozzle plate does not necessarily have to be arranged with the above-mentioned distance between them. There is no restriction on positioning the nozzle pipes; one may provide a series of nozzle pipes concentrically, or in the so-called checkered pattern, by providing two adjacent rows of the nozzle pipes to position pipes of one row centered between two pipes, successively aligned in another row. Indeed, one may position nozzle pipes at random, so long as the above-mentioned positional requirements between the pipes are satisfied.

The internal diameter of the nozzle holes is determined according to the desired particle diameter of the particulate chemical substance to be granulated, and usually is in the range of about 40% to about 80% of the desired particle diameter. For example, when a product with an average particle diameter of about 1.0 mm is manufactured, the internal diameter of the nozzle holes is about 0.40-0.80 mm, and preferably about 0.45-0.65 mm. There are no specific limitations to the external diameter, provided that the nozzle pipe has an appropriate thickness to provide sufficient strength to withstand handling without being broken and to maintain the above-mentioned distance between the adjacent nozzle pipes.

The vertical cross section of the nozzle pipe 2 may form a tapered portion 3 having a tapered cross section at the upper bonding portion between the nozzle plate and the pipes, as shown in FIG. 2(a), or FIG. 2(b). Additionally, the vertical cross section of the nozzle pipe 2 may form, at the tip of the nozzle pipe, a portion 4 tapered upwardly having a cross section gradually widening downwardly towards the tip of the nozzle pipe, as shown, for example, in FIG. 2(c). Furthermore, the tip 5 at the top portion thereof may usually be a thinned portion. The nozzle pipe having the cross section shape shown in FIG. 2 (c) is preferable. This is because good separation of a liquid dropping from the tip of the pipe is achieved. FIG. 2 (a) shows a cross section in the vertical direction of the nozzle pipe made of a thick single pipe, and FIG. 2 (b) shows a cross section in the vertical direction of a double nozzle pipe. Usually, the internal face of the pipe is a mirror-like face (not depicted); however, the pipe may have an internal structure wherein plural numbers of elevated portions 6 are provided at a predetermined spacing, as shown in FIG. 2(f).

The material for the nozzle pipe is selected taking the properties of the chemical substance to be used therein into consideration. A material resistant to acid and wear is preferably used for injecting the chemical substance. In addition, the nozzle plate must be periodically washed. Because the nozzle pipes project from the nozzle plate used in the present invention, the nozzle pipes must have sufficient strength to withstand physical impact during handling necessarily performed in the washing work, such as dismantling, transporting, washing, and re-installing without chipping, bending, or falling out. For that reason, it is preferable to use a single pipe or multiple pipes with large wall thickness. It is preferable to use a thick single pipe having a structure in the horizontal direction as shown in FIG. 2 (d), or a multiple pipe such as a double pipe having a structure in the horizontal direction as shown in FIG. 2 (e) as a material for nozzle pipe. Taking acid resistance, wear resistance, and the like into consideration, materials such as 304SS and 316LSS stainless steel, Hastelloy, and the like are suitably used. The other operating conditions of the apparatus may appropriately be selected taking the properties of the raw material chemical substance and the like into consideration.

One may produce a particulate chemical substance having a substantially spherical shape by using a thus constituted nozzle plate; the particle size distribution of this particulate chemical substance thus obtained comprises 80% or more of particles having diameter of from 1.0 mm to less than 2.0 mm, with less than 20% of the particles having diameter from 0.5 mm to less than 1.0 mm; and preferably, 85% or more of particles having diameter of from 1.0 mm to less than 2.0 mm, with less than 15% of particles having diameter of from 0.5 mm to less than 1.0 mm. The present inventive method is quite preferable in protecting workers from being exposed to dusts generated during handling chemical substances, such as phenothiazine, from the hygienic viewpoint of the safety of the working environments. The particulate chemical substance obtain able by the present inventive method is a product having unique properties which never existed before in the sense that the shape is substantially uniformly spherical, and the particle size distribution comprises 80% or more of particles having diameter of from 1.0 mm to less than 2.0 mm, with less than 20% of particles having diameter from 0.5 mm to less than 1.0 mm, and preferably, 85% or more of particles having diameter of from 1.0 mm to less than 2.0 mm, with less than 15% of particles having diameter of from 0.5 mm to less than 1.0 mm. Especially, when the substance is phenothiazine, any particulate phenothiazine having those properties never existed before the present invention.

EXAMPLES

The present invention is below described in detail by examples, which should not be construed as limiting the present invention.

Example 1

Figure 3:
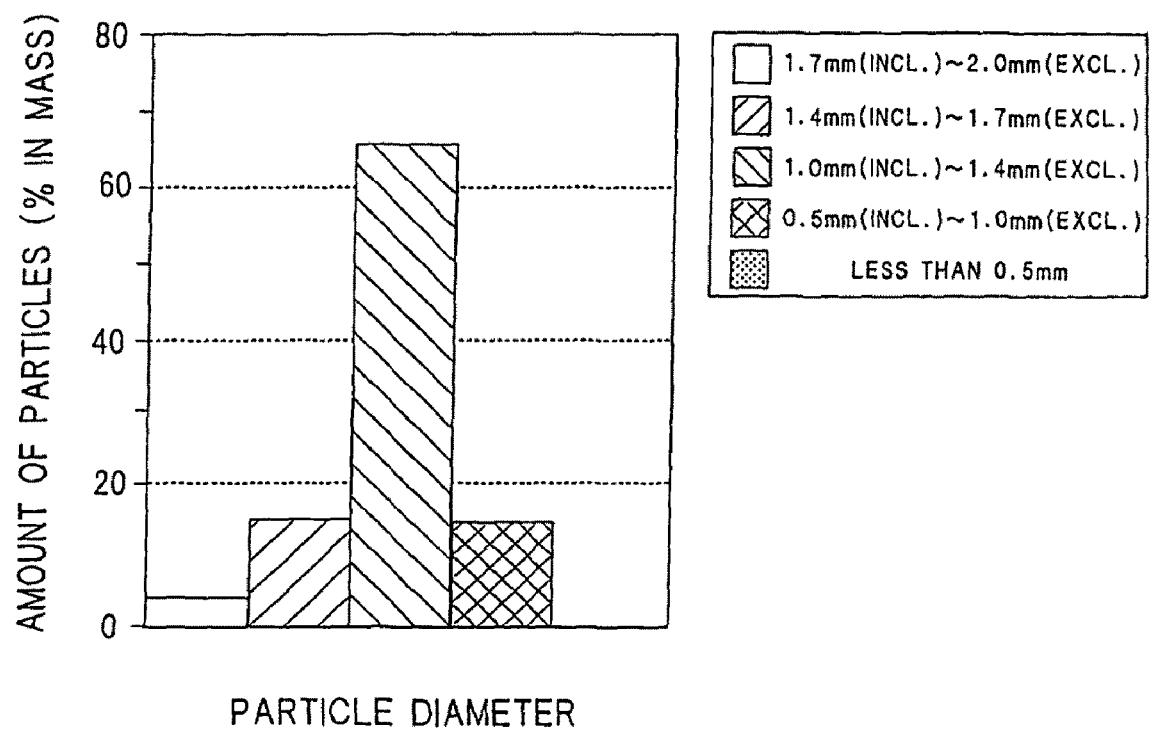
FIG. 3 is a graph showing particle size distribution of the particulate substance according to Example 1.

A spray granulation apparatus having a nozzle plate made of 304SS stainless steel with a thickness of 6 mm is used as a granulation apparatus. The nozzle plate is provided with pipes with an inner diameter of 0.45 mm, an outer diameter of 2.0 mm, and a length of 20 mm. A desired number of pipes are soldered as nozzle pipes. Phenothiazine, with a melting point of 182° C., is heated to 210-230° C. to melt and is dropped through the nozzle plate with nozzle pipes. The back pressure during dropping is kept at 0.05-0.1 MPa. Cold nitrogen gas is blown counter-currently into the droplets to obtain phenothiazine particles. The particle size distribution after completion of granulation is shown in the following Table 1. The phenothiazine, just after production, without sieving, is subjected to sieving using JIS Standard Sieves to determine the particle size distribution, and the result thereof is shown in Table 1 below. FIG. 3 is a graph showing thus obtained particle size distribution. As is clear from this graph, in the particle size distribution, the particles having diameter of from 1.0 mm to less than 2.0 mm constitute 80% or more, and the particles having diameter of from 0.5 mm to less than 1.0 mm constitute less than 20%. And, because the separation of particles according to the particle diameter is quite low during pneumatic transportation, a smooth transportation can be achieved. Furthermore, it is evident that the particulate phenothiazine produced according to the present invention is excellent in solubility. This is because the particulate belonging to the fraction having a particle diameter of from 1.0 mm to less than 1.4 mm comprises 65.83%, which is considered to be favorable in the solubility in acrylic acid, which is a major use thereof.

TABLE 1

| Particle diameter in mm | Amount of particles (wt %) |
| --- | --- |
| 1.7 mm or more – less than 2 mm | 4.18 |
| 1.4 mm – 1.7 mm | 15.18 |
| 1.0 mm – 1.4 mm | 65.83 |
| 500 µm – 1.0 mm | 14.79 |
| 355 µm – 500 µm | 0.02 |
| 180 µm – 355 µm | 0.00 |
| Less than 180 µm | 0.02 |

The hardness of the particles obtained is measured by the following method:

Tested particles: Eight phenothiazine particles having a diameter of 1.0-1.1 mm, which is almost equivalent to the average particle diameter, are selected from each sample for the test. As controls, commercially available phenothiazine products A produced by a US company and B produced by a European company are used.

Test Conditions

Testing machine: A tensile strength tester, STROGRAPH-R3, manufactured by Toyo Seiki Seisakusho, Ltd. is used. Using the compression function of this tester, pressure is gradually applied to the particles. The load (g/particle) when the particles fractured is deemed to be the hardness.

Load increasing rate: 50 mm/min.

Full scale: 200 g

Particles tested in this Example have a minimum hardness of 74 g, and a maximum hardness of 158 g, with an average (n=8) of 103.4 g, where as in the commercial product A, the minimum is 46 g, and the maximum is 106 g, with an average (n=8) of 74.5 g, and in the commercial product B, the minimum is 68 g, and the maximum is 118 g, with an average (n=8) of 90.8 g. The results of this hardness test show good agreement with the low dust generating degree in pneumatic transportation.

Figure 4:
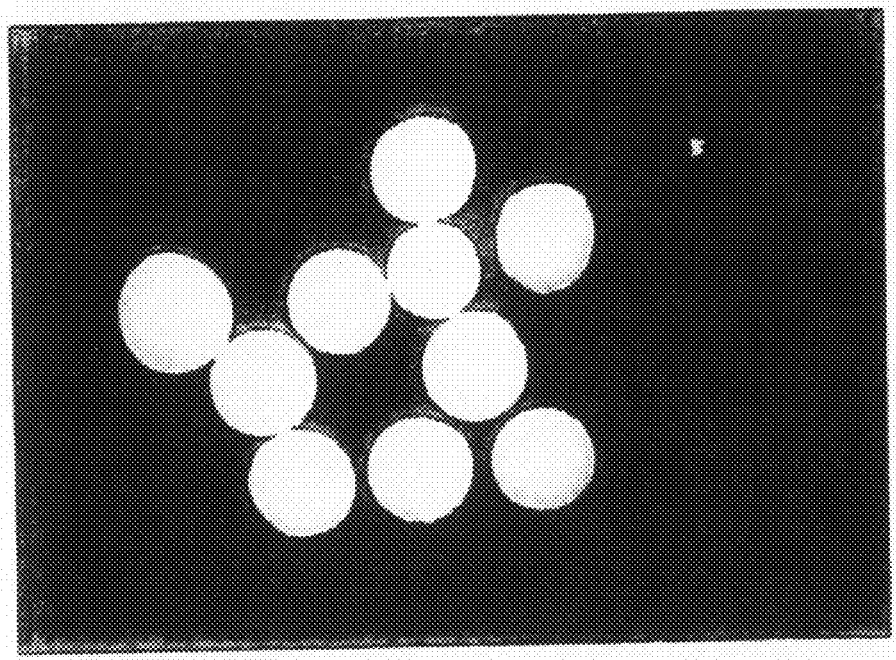
FIG. 4 is a microphotograph of particles obtained according to Example 1 of the present invention.
Figure 5:
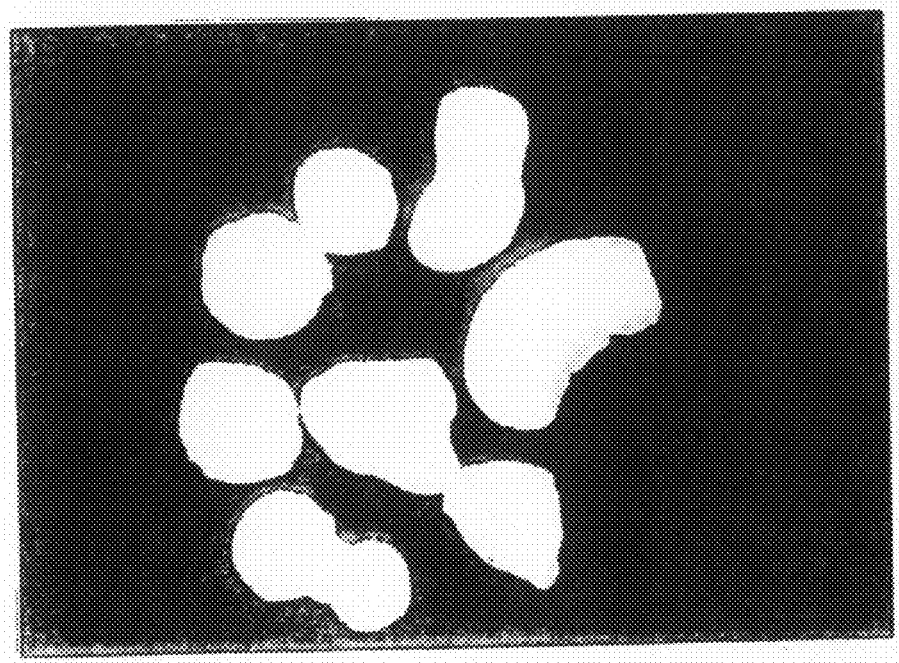
FIG. 5 is a microphotograph of particles available in the market, all of which show non-spherical shape.

The shape of the particulate phenothiazine taken from the same sample as that used for the hardness test is observed under a microscope (manufactured by Mitsubishi Chemicals; Microwatcher model VS-60, at 10 times magnification. The particulate obtained in Example 1 above shows substantially whole spherical shape, but the presence of particulates having non-spherical shape is not observed. However, in case of the product A obtained in the market, the presence of shapes other than the spherical shape such as dented shape, burred shape at the circumference portion, dumbbell-like shape or the like are observed. The microphotographs of particulates obtained according to Example 1 of the present invention, and the particulates from the market all of which show a non-spherical shape, are shown in FIG. 4 and FIG. 5, respectively.

Example 2

Figure 6:
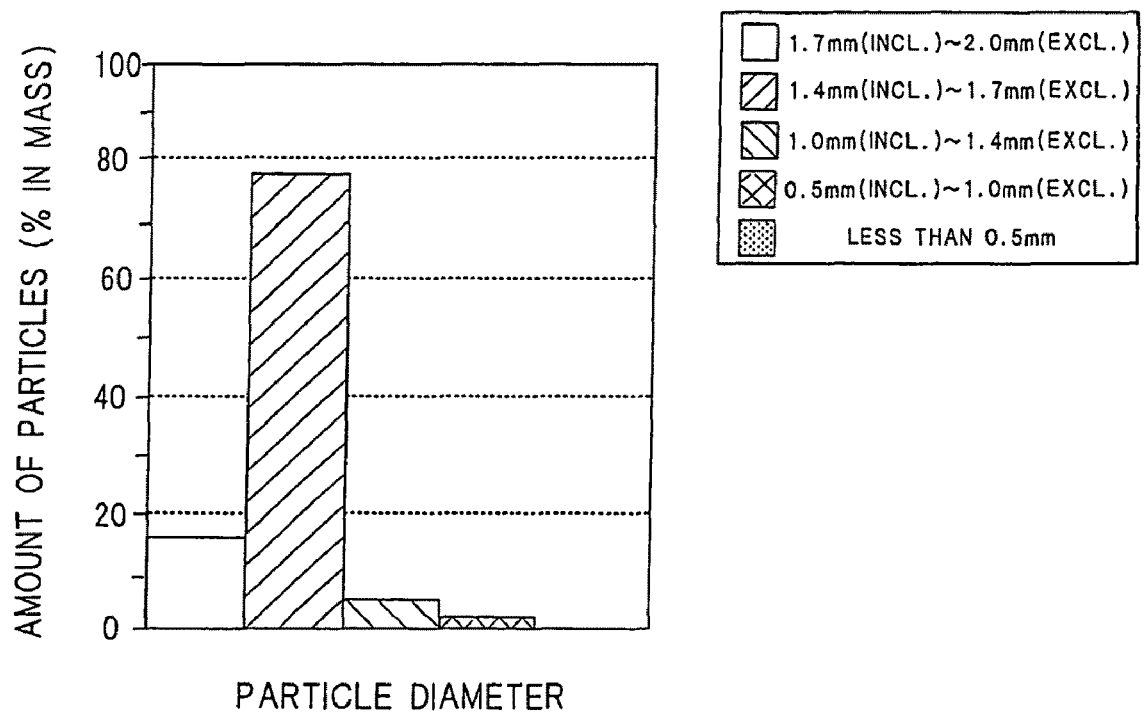
FIG. 6 is a graph showing particle size distribution of the particulate substance according to Example 2.

The same experiment as in Example 1 is carried out except using wax with a melting point of 75° C., which is heated to 110-130° C. to melt and dropped. The back pressure during dropping was 0.05-0.1 MPa. Cold air is blown counter-currently into the mass to obtain wax particles. The particle size distribution after completion of granulation is shown in the following Table 2. FIG. 6 is a graph showing this particle size distribution. Moreover, the microscope examination in the same manner reveals that a similar result to that in Example 1 is observed.

TABLE 2

| Particle diameter | Amount of particles (wt %) |
| --- | --- |
| 1.7 mm – 2.0 mm | 15.54 |
| 1.4 mm – 1.7 mm | 77.52 |
| 1.0 mm – 1.4 mm | 5.40 |
| 0.5 mm – 1.0 mm | 1.51 |
| Less than 0.5 mm | 0.05 |

INDUSTRIAL APPLICABILITY

The method of the present invention is excellent due to its capability of manufacturing particulate chemical substances containing substantially no particles with variant configurations, exhibiting a normal particle size distribution, and having sufficient hardness to withstand pneumatic transportation.

The particulate chemical substances manufactured by this method have sufficient hardness to produce substantially no dust and, therefore, results in excellent materials from the viewpoint of labor health environment. Thus, the present invention has high industrial applicability.

The invention claimed is:

1. A method for manufacturing a particulate chemical substance, the method comprising:
providing a spray granulation apparatus comprising a nozzle plate base comprising a rigid, substantially planar plate having a plurality of nozzle holes therein, each for receiving a nozzle pipe; and a plurality of nozzle pipes extending downwardly from the nozzle holes, the axes of the nozzle pipes being substantially parallel to each other, and each of the nozzle pipes having a length of 2 to 100 mm, measured from the surface of the nozzle plate base to the tip of the nozzle pipe; and
dropping from the plurality of nozzle pipes, and under pressure, a molten chemical substance, the chemical substance having a melting point of 50 to 250° C., to be granulated through said nozzle plate, without vibrating the molten chemical substance.

2. A method according to claim 1, wherein the chemical substance is heated at a temperature of at least 30° C. higher than the melting point of the chemical substance.

3. A method according to claim 1, wherein the chemical substance is heated at a temperature at least 20° C. higher than the melting point of the chemical substance.

4. A method according to claim 1, wherein the chemical substance is a substance selected from the group consisting of phenothiazine, phthalic anhydride, benzoic acid, paraffin wax, and naphthalene.

5. A method according to claim 1, wherein the particulate chemical substance is substantially spherical.

6. A method according to claim 1, wherein 80% or more of the particulate chemical substance are particles having a diameter between 1.0 mm and 2.0 mm.

7. A method according to claim 1, wherein 85% or more of the particulate chemical substance are particles having a diameter between 1.0 mm and 2.0 mm.

* * * * *